Patented May 28, 1946

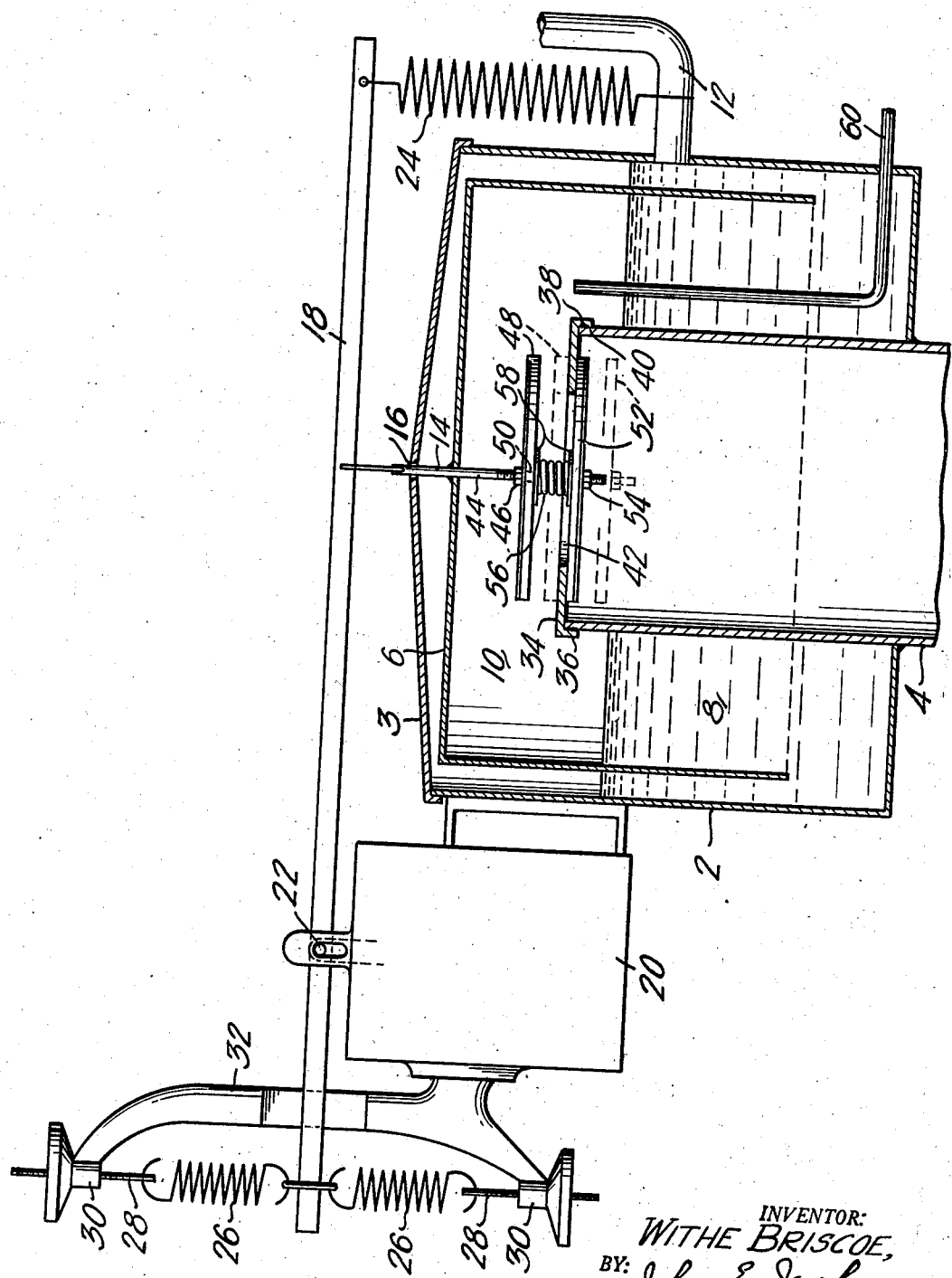

2,401,046

UNITED STATES PATENT OFFICE 2,401,046

SAFETY DEVICE FOR LIQUID SEALED GAS PRESSURE FLOATS

Withe Briscoe, Elizabeth, Pa.

Application March 30, 1944, Serial No. 528,753

2 Claims. (Cl. 137—156)

This invention relates to a safety device for liquid sealed gas pressure floats such as are employed to control pressure regulators and the like, and is a continuation-in-part of my co-pending application, Serial No. 447,990, filed June 22, 1942. The device may be used in connection with the flow of gas from by-product coke ovens to the by-product plant. An impulse line connected to the gas flow main leads to a liquid sealed float. Changes in gas pressure in the gas flow main causes the float to move up or down, this changing the position of a pilot valve to control the regulator to bring the pressure back to that at which it is desired to maintain the gas. In case the pressure in the gas flow main is suddenly raised to an excessive pressure, the fluid of the seal will be blown out and the gas will escape to the air. This is undesirable since the gas is inflammable and there is danger of a fire or explosion taking place. In some instances, the pressure is suddenly reduced causing a suction at the gas flow main, this pulling the oil from the seal into the impulse pipe and thence into the gas flow main. When the gas is again under pressure, it will escape to the air since the liquid seal is no longer present.

It is an object of this invention to provide a safety device for use with a gas pressure float to prevent the liquid seal from being blown out or sucked into the impulse line in the event of a sudden change of pressure.

This and other objects will be more apparent after referring to the following specification and attached drawing in which the single figure is a cross sectional view of the invention showing its relationship to the gas regulator.

Referring more particularly to the drawing, the reference numeral 2 indicates a casing having a cover 3. An impulse conduit 4 is fastened to the casing 2 and leads to a gas main (not shown), the gas pressure in which is to be controlled. Within the casing 2 is a bell float 6, the lower end of which is open and extends into the oil seal 8. Within the bell float 6 is a gas chamber 10 above the oil seal 8. A filler pipe 12 is provided for supplying oil to the oil seal. Welded or otherwise rigidly connected to the bell float 6 is a rod 14 which extends upwardly through a hole 16 in the casing cover 3. The top of the rod 14 is connected in any suitable manner to the level bar 18 which extends to the motor controlling pilot valve 20 and is connected thereto at 22. One end of the level bar is provided with an equalizing spring 24 attached to the filler pipe 12 as shown. The other end of the bar 18 extends beyond the pilot valve 20 and is provided with equalizing springs 26 which, as shown, are fastened to the screws 28 received in stationary nuts 30 mounted on the bracket 32 attached to the pilot valve 20. The tension on the springs 26 may be changed by changing the position of the bolts 28.

My improvement consists of providing a valve seat 34 at the top of the pipe 4. As shown, the valve seat is provided with a downwardly extending flange 36 which is threaded internally at 38 and is attached to the threaded end 40 of the pipe 4. The valve seat 34 is provided with an opening 42 through which the gas passes into the gas chamber 10. The rod 14 is provided with an extension 44 which extends down into the pipe 4 and functions as a valve stem. The lower part of the extension 44 is threaded and has a nut 46 threaded thereon as shown. Directly below the nut 46 is a valve disk 48 having an opening 50 through which the valve stem passes. A second valve disk 52 which is similar to valve disk 48 is received on the valve stem below the disk 48 and held thereon by means of the nut 54. Between the disks 48 and 52 and surrounding the valve stem 44 is a spring 56 which bears against washers 58 to hold the disks in spaced apart relationship. It will be understood that the disks 48 and 52 may be held in the separated position by any suitable means. In order to determine the gas pressure in the gas main, a pipe 60 may be provided, one end of which extends into the chamber 10 and the other end of which leads to a pressure gage (not shown).

The operation of the device is as follows:

As the pressure in the gas main increases above a predetermined amount which is determined by the setting of the regulator, the float 6 rises transmitting its motion by means of the rod 14 to the level bar 18 which is kept level by means of the equalizing springs 24 and 26 which also act to stabilize the movement of the level bar. As the level bar moves upwardly, it transmits its motion to the pilot valve 20 by means of the connection 22 to cause the regulator to restore the pressure in the gas main. When the pressure in the main decreases below the pressure at which the regulator is set, the float drops and the movement of the level bar is again transmitted to the pilot valve 20 to restore the pressure in the gas main. Normally the movement of the bell float 6 will be such that the valves 48 and 52 will both be in open position and the gas can move freely into the chamber 10. Formerly, when there was a sudden increase in pressure, the float 6 rose until it was stopped by the lid 3 and the pressure of the gas forced the oil from the oil seal causing it and the gas to escape from the casing 2 through the opening 16. In many instances the escaping gas caught on fire causing considerable damage. In like manner, when there was a sudden suction on the gas main, the oil from the oil seal was drawn into the pipe 4.

With my invention the escape of the oil is prevented as follows:

When the pressure suddenly increases, the float rises to the position shown in full lines and the valve 52 seats on the lower side of the seat 34. This prevents flow of the gas to the chamber 10 and the pilot valve will hold the regulator in position for maximum gas flow until the pressure drops, causing the float 6 to lower and opening the passage from the conduit 4 to the chamber 10. When there is a sudden suction in the gas main, the float 6 drops and the valve 48 seats on the top of the valve seat 34 as shown in broken lines, this preventing the flow of gas into the chamber 10. This causes the pilot valve 20 to hold the regulator in position for no gas flow until the pressure rises sufficiently to again float the float 6. By changing the positions of the disks 48 and 52 on the valve stem 44, the safety device can be adjusted to seal the chamber against any predetermined pressure or suction.

While one embodiment of the invention has been shown and described, it will be understood that other adaptations and modifications may be made without departing from the scope of the following claims.

I claim:

1. A safety device for gas pressure responsive float operators, said device comprising a casing, a gas conduit extending through the bottom of said casing, a movable inverted bell float in said casing, a liquid seal surrounding said conduit and forming a gas chamber in the upper part of said bell float, a valve seat in said conduit having upper and lower faces, means forming an outlet from said conduit to said chamber, a valve stem connected to said float for movement therewith, spaced apart valve disks mounted on said stem, one of said disks being adapted to seat on said top face and the other being adapted to seat on said bottom face to close said outlet upon a predetermined change of the pressure in said gas conduit, resilient means opposing the upward and downward movement of said float, and means for changing the position of the disks on said stem for varying the pressure at which said valves will close.

2. A safety device for gas pressure responsive float operators, said device comprising a casing, a gas conduit extending through the bottom of said casing, a movable inverted bell float in said casing, a liquid seal surrounding said conduit and forming a gas chamber in the upper part of said bell float, a valve seat having upper and lower faces fastened to the top of said conduit, said valve seat having an opening therein forming the only normal means of communication with said gas chamber, a valve stem connected to said float for movement therewith, spaced apart valve disks mounted on said stem, one of said disks being adapted to seat on said top face and the other being adapted to seat on said bottom face, a spring connected to said stem to oppose upward and downward movement thereof, and means for changing the position of the disks on said stem for varying the pressure at which said valves will close.

WITHE BRISCOE.